(12) United States Patent
Balaji et al.

(10) Patent No.: US 12,021,895 B2
(45) Date of Patent: Jun. 25, 2024

(54) MALWARE DETECTION WITH MULTI-LEVEL, ENSEMBLE ARTIFICIAL INTELLIGENCE USING BIDIRECTIONAL LONG SHORT-TERM MEMORY RECURRENT NEURAL NETWORKS AND NATURAL LANGUAGE PROCESSING

(71) Applicant: Bank of America Corporation, Charlotte, NC (US)

(72) Inventors: Sujatha Balaji, Kovilambakkam (IN); Ramachandran Periyasamy, Kallakurichi (IN); Sneha Mehta, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 276 days.

(21) Appl. No.: 17/411,630

(22) Filed: Aug. 25, 2021

(65) Prior Publication Data

US 2023/0063913 A1     Mar. 2, 2023

(51) Int. Cl.
*H04L 9/40* (2022.01)
*G06F 40/20* (2020.01)
*G06N 3/045* (2023.01)

(52) U.S. Cl.
CPC .......... *H04L 63/1483* (2013.01); *G06F 40/20* (2020.01); *G06N 3/045* (2023.01)

(58) Field of Classification Search
CPC ...... H04L 63/1483; G06F 40/20; G06N 3/045
See application file for complete search history.

(56) References Cited

U.S. PATENT DOCUMENTS

| | | | |
|---|---|---|---|
| 11,301,563 B2 | 4/2022 | Huang et al. | |
| 11,301,759 B2 | 4/2022 | Lin et al. | |
| 11,556,653 B1 * | 1/2023 | Han | G06F 21/577 |
| 11,562,204 B2 | 1/2023 | Yoo | |
| 11,571,162 B2 | 2/2023 | Banerjee et al. | |

(Continued)

OTHER PUBLICATIONS

Long short-term memory; WikipediA; https://en.wikipedia.org/wiki/Long_short-term_memory; downloaed Aug. 5, 2021; article 9 pages.

(Continued)

*Primary Examiner* — Lynn D Feild
*Assistant Examiner* — Saad Ahmad Abdullah
(74) *Attorney, Agent, or Firm* — Banner & Witcoff, Ltd.

(57) ABSTRACT

A multi-level, ensemble network monitoring system for detection of suspicious network activity from one or more a plurality of user computing devices on an external network communicatively connected via a network server to a private communication network is disclosed. In malware detection, the ensemble network monitoring system comprises artificial intelligence (AI) with bidirectional long short-term memory (BDLSTM) recurrent neural networks (RNNs) and natural language processing (NLP) to predict possible security threats and then initiate remedial measures accordingly. Enabling a proactive approach to detection and prevention of potential malicious activity, the BDLSTM RNN may perform real-time monitoring and proactively forecast network security violations to block network communications associated with high-risk user computing devices from accessing a private communication network.

20 Claims, 6 Drawing Sheets

(56) References Cited

U.S. PATENT DOCUMENTS

| | | | |
|---|---|---|---|
| 11,595,437 | B1 | 2/2023 | Mushtaq |
| 11,797,705 | B1 | 10/2023 | Voinea et al. |
| 11,822,544 | B1 | 11/2023 | Carvalho et al. |
| 2014/0380482 | A1* | 12/2014 | Thomas ............... H04L 63/145 726/23 |
| 2016/0071515 | A1* | 3/2016 | Lehman ................. G10L 15/16 704/232 |
| 2018/0124110 | A1* | 5/2018 | Hunt ..................... G06F 16/951 |
| 2018/0219895 | A1 | 8/2018 | Silver et al. |
| 2018/0248895 | A1 | 8/2018 | Watson et al. |
| 2019/0325514 | A1 | 10/2019 | Hong |
| 2020/0184307 | A1 | 6/2020 | Lipka et al. |
| 2020/0293655 | A1 | 9/2020 | Long et al. |
| 2020/0358819 | A1* | 11/2020 | Bowditch ............... G06F 17/18 |
| 2021/0200955 | A1 | 7/2021 | Ben Kimon et al. |
| 2021/0281593 | A1 | 9/2021 | Liu et al. |
| 2022/0172039 | A1 | 6/2022 | Liu et al. |
| 2022/0237465 | A1 | 7/2022 | Lewis et al. |
| 2022/0350970 | A1* | 11/2022 | Rizk ...................... H04L 51/04 |
| 2022/0358356 | A1 | 11/2022 | Gusat et al. |
| 2022/0414329 | A1* | 12/2022 | Bulu ....................... G06N 5/02 |
| 2023/0084641 | A1 | 3/2023 | Roy et al. |

OTHER PUBLICATIONS

Ahmet; Long Short Term Memory (LSTM) Networks in a nutshell; https://ahmetozlu93.medium.com/long-short-term-memory-Istm-networks-in-a-nutshell-363cd470ccac; article; 5 pages.

Constant Error Carousel Definition; DeepAI; https://deepai.org/machine-learning-glossary-and-terms/constant error carousel; downloaded Aug. 5, 2021; article; 1 page.

Understanding LSTM Networks—colah's blog; posted on Aug. 27, 2015; 9 pages.

Cui et al., "Stacked Bidirectional and Unidirectional LSTM Recurrent Neural Network for Network-wide Traffic Speed Prediction"; article; 11 pages; Sep. 2020.

* cited by examiner

MALWARE DETECTION WITH MULTI-LEVEL, ENSEMBLE ARTIFICIAL INTELLIGENCE USING BIDIRECTIONAL LONG SHORT-TERM MEMORY RECURRENT NEURAL NETWORKS AND NATURAL LANGUAGE PROCESSING

FIELD

Aspects described herein generally relate to the field of malware detection; and, specifically to predicting possible security threats using multi-level, ensemble artificial intelligence (AI) with bidirectional long short-term memory (LSTM) recurrent neural networks (RNNs) and natural language processing (NLP); and then initiating remedial measures accordingly.

BACKGROUND

Information security is an important aspect of the financial and banking sectors. Malware attacks (e.g., phishing attacks, cyberattacks, ransomware) on a company's systems trigger violations that can pave the way to compliance issues and disciplinary actions including monetary penalties and loss of reputation. Several current systems have perimeter layer controls in place that monitor and detect suspicious activity and involves a lot of manual human intervention. In addition, a drawback of these current system is that there is no any proactive measure to warn the user or company's system while an analysis is performed of such suspicious activity. Sometimes a user might not be escalated until after 24 hours or more after the activity. Moreover, all the parameters about the activity might not be captured, thus it is even difficult to drill down more on the violation and create awareness with the users and company.

SUMMARY

Aspects of the disclosure provide solutions that address and overcome technical problems associated with detection of suspicious network activity from an external network communicatively connected via a network server to a private communication network. Disclosed herein is a multi-level, ensemble network monitoring system for malware detection that comprises artificial intelligence (AI) with bidirectional long short-term memory (BDLSTM) recurrent neural networks (RNNs) and natural language processing (NLP) to predict possible security threats and then initiate remedial measures such as blocking network communications associated with high-risk user computing devices from accessing a private communication network.

In one example, a multi-level, ensemble network monitoring system is disclosed comprising a high-volume data storage unit, at least one computer processor, a first-level natural language processing (NLP) module, a second-level artificial intelligence (AI) module, and a computer memory. The multi-level, ensemble network monitoring system may perform steps of receiving, from the first-level NLP module, information associated with network activity corresponding to user computing devices, and processing, by the computer processor, the generated vectors detect if the suspicious network activity exists. If the system fails to detect the suspicious network activity, then the second-level AI module predicts, using the generated vectors, whether the network activity is suspicious. The system may send, based on the predicting, an indication to a network server to block communications from accessing the private communication network.

In another example, a recurrent neural network (RNN) system in a multi-level, ensemble network monitoring system is disclosed. The RNN system may comprise historical training data, generated vectors, and a bidirectional long-short term memory (BDLSTM) recurrent neural network (RNN), as described herein.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Malicious actors may target networks associated with an enterprise organization to exfiltrate confidential information and/or other nefarious purposes. For example, the enterprise organization may be financial organization (e.g., a bank) and the confidential information may be associated with the clients of the financial organization. Various attack vectors may be used to target enterprise networks (e.g., phishing, malware, ransomware, and the like).

While enterprise organization may have a perimeter layer controls in place to monitor and detect any suspicious activity (e.g., suspicious browsing activity, network operations), it may require significant manual intervention. Further, these controls often do not include proactive measures to warn users while they perform such a suspicious activity.

Manual review of activity may be performed only periodically (e.g., once every 24 hours) and the activity may only be detected at a later time.

Various examples described herein enable a proactive approach to detection and prevention of potential malicious activity. An artificial intelligence-enabled network monitoring platform may be used to perform real-time monitoring of network activity and proactively warn users and/or otherwise initiate remedial measures. The network monitoring platform may use a multi-level, ensemble approach that comprises a natural language processing (NLP)/natural language understanding (NLU) module to detect potential network security issues. The network monitoring platform may further comprise a bidirectional long short-term memory (BDLSTM) recurrent neural network (RNN) as a second level of the network monitoring platform that may be used to proactively forecast network security violations. A risk transfer control system may interact with the NLP/NLU module and the BDLSTM RNN to proactively warn users, escalate an alert to an administrative user, and/or abort a potentially malicious network process.

Figure 1A:
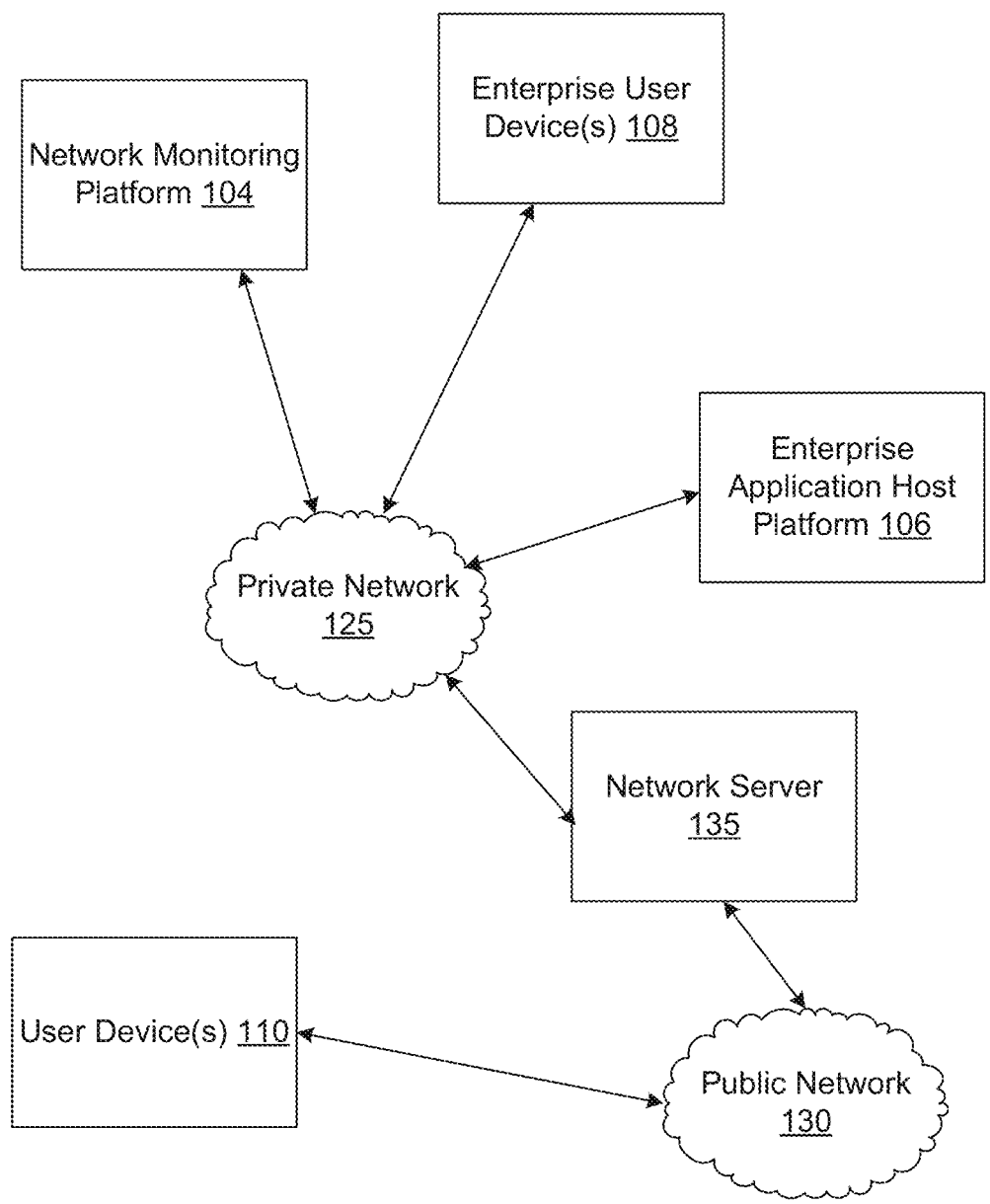
FIG. 1A shows an illustrative computing environment for electronic monitoring and securing of physical locations, in accordance with one or more example arrangements.

FIG. 1A shows an illustrative computing environment 100 for network monitoring, in accordance with one or more arrangements. The computing environment 100 may comprise one or more devices (e.g., computer systems, communication devices, and the like). The computing environment 100 may comprise, for example, a network monitoring system/platform 104, an enterprise application host platform 106, and/or one or more enterprise user devices 108. The one or more of the devices and/or systems, may be linked over a private network 125 associated with an enterprise organization (e.g., a financial institution). The computing environment 100 may additionally comprise one or more user devices 110 connected, via a public network 130 and through a network server 135, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), and the like).

The network monitoring platform 104 may comprise one or more computing devices and/or other computer components (e.g., processors, memories, communication interfaces) configured to perform one or more functions as described herein. Further details associated with the architecture of the network monitoring platform 104 are described with reference to FIG. 1B. The network server 135 may serve, in some embodiments, as a gateway or gatekeeper to control and/or block the flow of data in/out of the private network 125. The network server 135 may receive instructions/commands from the network monitoring platform 104 or other devices on the private network 125 to regulate which devices may communicate with the private network and devices thereon.

The enterprise application host platform 106 may comprise one or more computing devices and/or other computer components (e.g., processors, memories, communication interfaces). In addition, the enterprise application host platform 106 may be configured to host, execute, and/or otherwise provide one or more enterprise applications. In an arrangement where the private network 125 is associated with a banking organization, the enterprise application host platform 106 may be configured, for example, to host, execute, and/or otherwise provide one or more transaction processing programs, such as an online banking application, fund transfer applications, and/or other programs associated with the financial institution. The enterprise application host platform 106 may comprise various servers and/or databases that store and/or otherwise maintain account information, such as financial account information including account balances, transaction history, account owner information, and/or other information. In addition, the enterprise application host platform 106 may process and/or otherwise execute transactions on specific accounts based on commands and/or other information received from other computer systems comprising the computing environment 100.

The enterprise user computing device 108 may be a personal computing device (e.g., desktop computer, laptop computer) or mobile computing device (e.g., smartphone, tablet). In addition, an enterprise user computing device 108 may be linked to and/or operated by a specific enterprise user (who may, for example, be an employee or other affiliate of the enterprise organization).

The user device(s) 110 may be computing devices (e.g., desktop computers, laptop computers) or mobile computing device (e.g., smartphones, tablets) connected to the network 125. The user device(s) 102 may be configured to enable the user to access the various functionalities provided by the devices, applications, and/or systems in the network 125.

In one or more arrangements, the network monitoring platform 104, the enterprise application host platform 106, the enterprise user devices 108, the user devices 110, and/or the other devices/systems in the computing environment 100 may be any type of computing device capable of receiving input via a user interface, and communicating the received input to one or more other computing devices in the computing environment 100. For example, the network monitoring platform 104, the enterprise application host platform 106, the enterprise user devices 108, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the network monitoring platform 104, the enterprise application host platform 106, the enterprise user devices 108, the user devices 110, and/or the other devices/systems in the computing environment 100 may, in some instances, be and/or comprise special-purpose computing devices configured to perform specific functions.

Figure 1B:
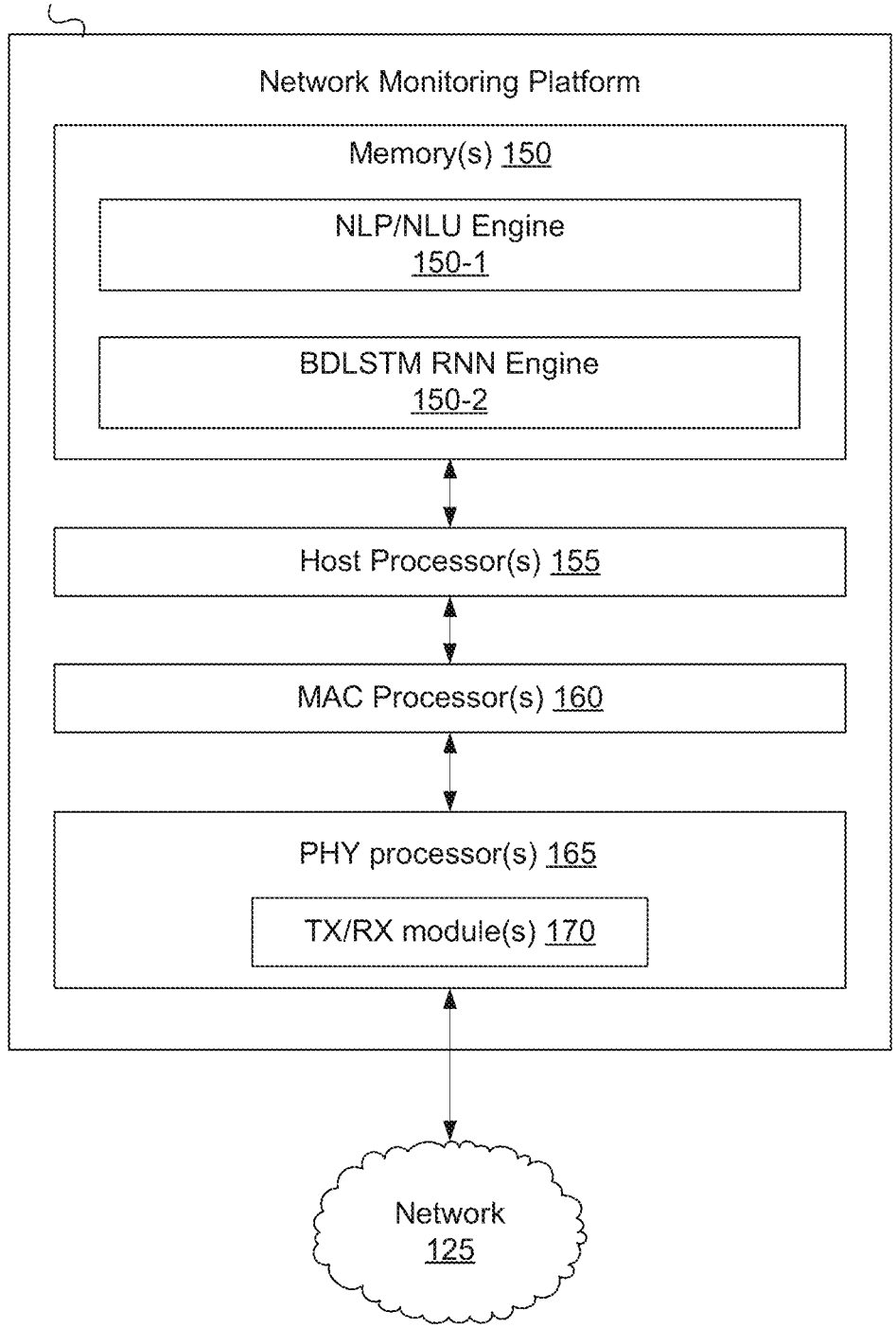
FIG. 1B shows an illustrative electronic monitoring platform, in accordance with one or more example arrangements.

FIG. 1B shows an example network monitoring platform 104 in accordance with one or more examples described herein. The network monitoring platform 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The network monitoring platform 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the network monitoring platform 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the network monitoring platform 104 may be configured to execute machine readable instructions stored in memory 150. The memory 150 may comprise (i) one or more program modules/engines having instructions that when executed by the one or more processors cause the network monitoring platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the network monitoring platform 104 and/or by different computing devices that may form and/or otherwise make up the network monitoring platform 104. For example, the memory 150 may have, store, and/or comprise the NLP/NLU engine 150-1 and/or BDLSM RNN engine 150-2. For example, the memory 150 may have, store, and/or comprise coefficients/weights associated with BDLSM RNN engine 150-2. The NLP/NLU engine 150-1 may have instructions that direct and/or cause the network monitoring platform 104 to perform one or more operations associated with NLP. The BDLSM RNN engine 150-2 may have instructions that may cause the network monitoring platform 104 to implement a neural network for detecting/forecasting potential malicious activity.

While FIG. 1A illustrates the network monitoring platform 104, the enterprise application host platform 106, and the enterprise user devices 108, as being separate elements connected in the private network 125, in one or more other arrangements, functions of one or more of the above may be integrated in a single device/network of devices. For example, elements in the network monitoring platform 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the enterprise application host platform 106, and/or the enterprise user devices 108.

Figure 2:
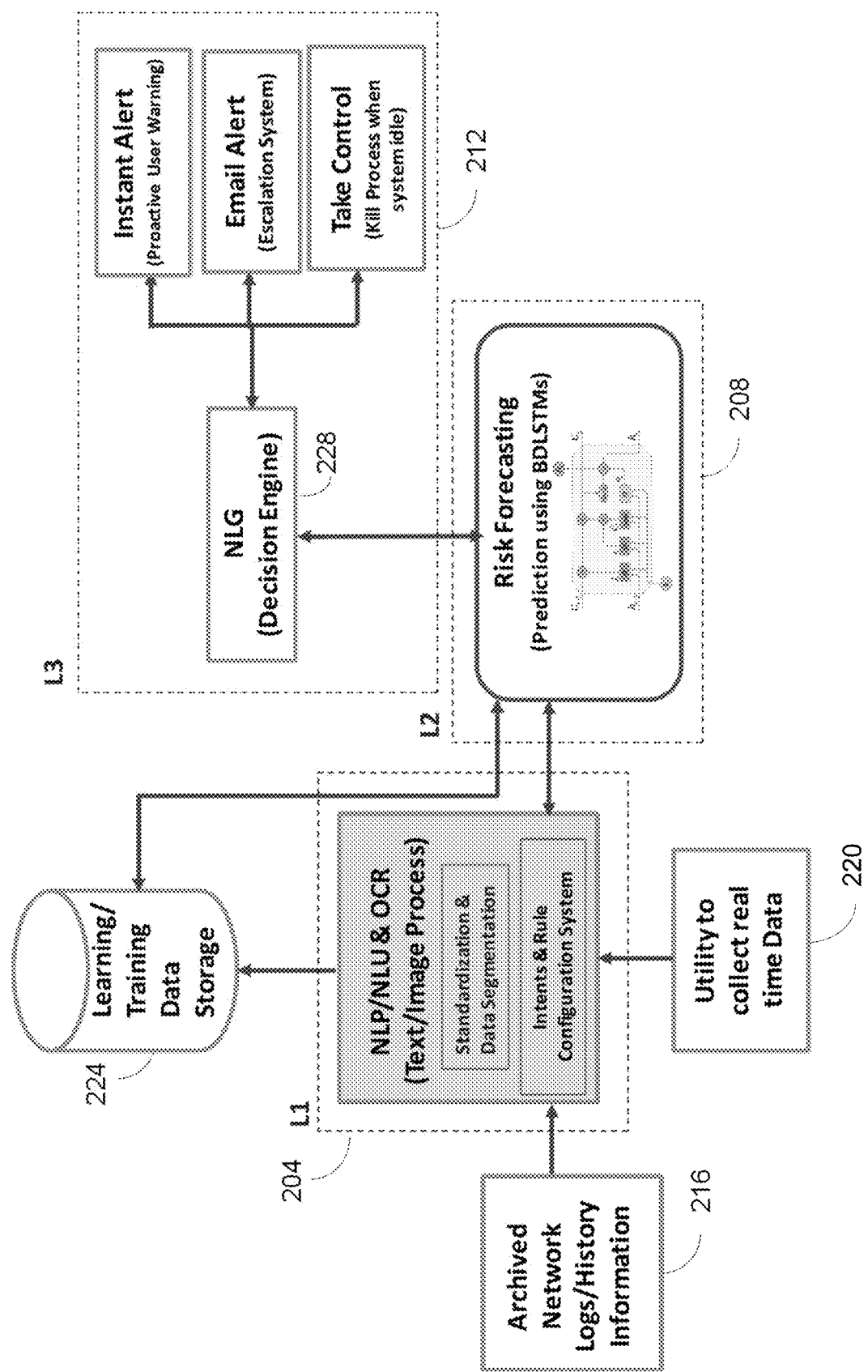
FIG. 2 shows an illustrative operation of a network monitoring platform that uses an ensemble approach, in accordance with one or more example arrangements.

FIG. 2 shows an example operation of the network monitoring platform 104. The network monitoring platform 104 may utilize an ensemble approach comprising an NLP/NLU module 204, a risk forecasting module 208, and a decision module 208. The network monitoring platform 104 may use a utility 220 to collect real time data regarding user activities within a network. For example, the network monitoring platform 104 may communicate with the enterprise user devices 108 and/or one or more servers associated with the private network 125 to collect user activity information. The user activity information associated with an enterprise user device 108 may comprise, for example, a listing of applications accessed via the enterprise user device 108, information related to internet browsing activity (e.g., websites accessed) of the enterprise user device 108, screenshots of a display associated with the enterprise user device 108, and the like. The collected user activity information may be stored in a database 216. The NLP/NLU module 204 may use optical character recognition (OCR) techniques to determine text within the user activity information.

The NLP/NLU module 204 may use standardization and data segmentation techniques to process text within the user activity information. The NLP/NLU module 204 may be configured to determine an intent associated with the user activity (e.g., based on configured rules associated with the activity). Based on the determined intent, the NLP/NLU module 204 may determine if the user activity information corresponds to suspicious user activity. For example, presence of certain words/phrases (e.g., confidential, client data, personal information, password, and the like) may trigger the NLP/NLU module 204 to classify the user activity as suspicious. As another example, use of certain commands (e.g., a command to delete information from a production database) may trigger the NLP/NLU module 204 to classify the user activity as suspicious. Information associated with any determination of suspicious user activity may be stored in a training data storage 224 (e.g., high-volume data storage unit) and used for training the risk forecasting module 208. The high-volume data storage 224 may further store historical training data collected over the private communication network regardless of whether it is suspicious user activity.

The NLP/NLU module 204 may be a first-level (L1 in FIG. 2) module of an ensemble, network monitoring system. The NLP module 204 may be configured as a pre-processor for feature engineering to generate vectors with intents based on at least network activity from the network server corresponding to a user computing device of the plurality of user computing devices. Moreover, the NLP module 204 may be configured as a pre-processor for feature engineering to generate vectors with entity data also based on at least network activity from the network server corresponding to a user computing device of the plurality of user computing devices. Generally, the ensemble network monitoring system may execute software to receive, from the L1 NLP module 204, information associated with the network activity corresponding to the user computing device 110 or enterprise user devices 108. That information may include generated vectors from the feature engineering by the NLP module 204. Next, the ensemble network monitoring system may process the generated vectors to detect if suspicious network activity exists. In some embodiments, the NLP module 204 monitors for the actual presence/existence of suspicious network activity and does not predict/forecast it; the NLP module 204 may detect suspicious network activity in real-time such that as the utility module 220 collects data regarding user activity within a network, the NLP module 204 pre-processes that data, inter alia, to generate vectors with intents associated with the information and entity data based on at least the network activity and outputs whether the NLP module 204 determines the network activity is suspicious.

Assuming the existence of suspicious network activity is found, the ensemble, network monitoring system may cause to be sent an indication to a network server 135 to block communications associated with user computing devices 110 from accessing the private communication network 125. The decision to block communications may be made in a L3 module 212 or, in some embodiments, in an earlier level/stage module such as L1 (ref. 204) or L2 (ref. 208). The blocking of communications by the network server 135 may be done through known methods and/or components of a router/gateway/firewall.

In some examples, the risk forecasting module 208 may use a BDLSTM RNN for predicting suspicious user activity. The risk forecasting module 208 may be used if the NLP/NLU module 204 is unable to determine whether the user activity is suspicious or not. The BDLSTM RNN may use a 3D input comprising time interval, input to the NLP/MLU module 204 and responses from the NLP/NLU module 204. Therefore, in some examples, the order of execution of the multi-level, ensemble network monitoring system is that the first-level NPL module 204 starts executing before the second-level AI module 208.

FIG. 2 illustrates one example of a multi-level, ensemble network monitoring system where if L1 (Ref. 204) is unable to detect suspicious network activity, then a second-level artificial intelligence module (e.g., 208) may predict suspicious network activity from a plurality of user computing devices on an external network communicatively connected via a network server to a private communication network. The L2 AI module 208 of the ensemble may be configured for reinforcement learning using the aforementioned generated vectors and/or the historical training data. The BDLSTM RNN in the L2 AI module 208 may analyze data in one or more databases (for example, Ref. 216) to predict potentially suspicious user activity and aid reinforcement learning using feedback connections. This may result in enrichment of training data and provide faster response times. The bi-directional characteristics of the LSTM RNN may be achieved, in some examples, by having sequence forwards and backwards to two separate RNNs, both of which are connected to the same output layer.

Assuming suspicious network activity was not found but was predicted, then the ensemble, network monitoring system may cause sending of an indication to the network server to block communications associated with the user computing device from accessing the private communication network, similar to discussed above.

In some examples, the L2 AI module 208 may predict that the network activity corresponds to the suspicious network activity from the user computing device by using a non-deterministic algorithm with randomness. In one example, the L2 AI module 208 may use a neural network that is equipped for learning long-term dependence in sequence prediction situations (e.g., A RNN capable of learning order dependence in sequence prediction problem) and can handle a different, diverse input data. For example, a constant error carousel (CEC) architecture may be used to assist the multi-level, ensemble network monitoring system to learn long-term relationships while simultaneously mitigating the downsides of prolonged testing. The CEC architecture assist with solving the training problem of vanishing and exploding gradients. In some modified CEC architectures, a gate (e.g., forget gate) may be used to reset the CEC.

Figure 3:
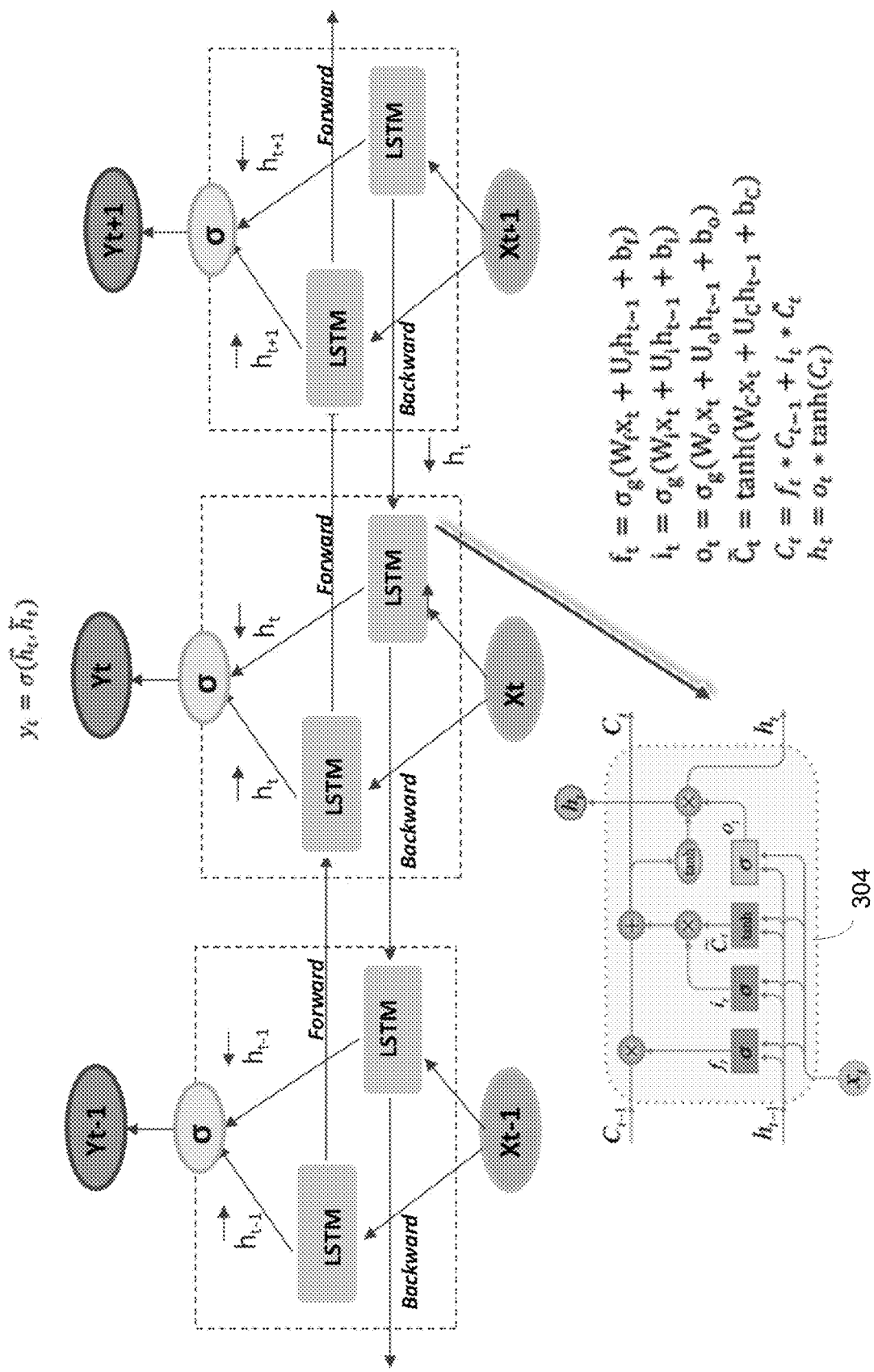
FIG. 3 shows an illustrative bidirectional long short-term memory (BDLSTM) recurrent neural network (RNN) comprising a cell unit and three gates, in accordance with one or more example arrangements.

FIG. 3 shows an example BDLSTM RNN with three consecutive steps. Each LSTM cell 304 in the BDLSTM RNN comprises a cell unit and three gates (input gate, forget gate, and output gate). Constant error carousel (CEC) enables the LSTM to learn the long-term relationships while mitigating the risks of prolonged testing, peephole connections, and the like. A time iteration may be represented as t, values in the input layer as $x_t$, values in the a hidden layer as $h_t$, values in the a previous hidden layer as $h_{t-1}$, and values in the output layer as y. Bias vectors corresponding to the input layer, the forget layer and the output layer may be represented as $b_x$, $b_f$, and $b_y$, respectively. In some examples, one cell may comprise a cell unit and three gates (e.g., an input gate, a forget gate, and an output gate). The gates use a sigmoid activation function, and the input and cell state is usually transformed by tanh, which is another activation function, or other activation function such as ReLu or a sigmoid function. The output of the block may be recurrently connected back to the block input and all of the gates. The gating mechanism can hold information for long durations.

The activation function of the output layer may be represented as $\sigma_y$, and the gate activation function may be represented as $\sigma_g$. Activation functions may be sigmoid functions. A cell input State may be represented as $\hat{C}_t$, a cell output state may be represented as $C_t$, and a previous cell output state may be represented as $C_{t-1}$. At time t, values of the input gate, the forget gate, and the output gate, may be denoted as $i_t$, $f_t$, and $o_t$, respectively. $W_f$, $W_i$, $W_o$, and $W_C$ may be the weight matrices mapping the hidden layer input to the three gates and the input cell state. $U_f$, $U_i$, $U_o$ and $U_C$ may be the weight matrices connecting the previous cell output state to the three gates and the input cell state. $b_C$ may be a bias vector for the cell input state. In some examples, a LSTM RNN might omit a forget gate, and instead a recurrent connection with a constant weight of 1 to reflect an unchanged cell state. Thus, the CEC addition to the RNN solves the training problem of vanishing and exploding gradients. Cell state act as a transport highway that transfers relative information all the way down the sequence chain.

The notification engine 212 may send notifications based on determination of suspicious activity by the NLP/NLU module 204 and/or the risk forecasting module 208. For example, the notification engine 212 may send a notification to the enterprise user device 108 or an administrative device. The notification may be, for example, an email notification. In an arrangement, the notification may an instruction to terminate a process (e.g., a user command, a user browsing session, and the like). The notification engine 212 may comprise a decision engine 228 that may send the notifications based on a natural language generation module.

In one example, the BDLSTM RNN includes layers comprising a forward direction hidden layer and a reverse direction hidden layer. Each layer may comprise a long-short term memory (LSTM) cell with an input gate, an output gate, and a forget gate. Moreover, the input gate, output gate, and the forget gate generate values in a time interval that are based on one or more of: a determined intent for the time interval, layer output for a previous time interval, and/or a bias vector. In addition, a layer output for the time interval may be generated based on the values generated by the input gate, output gate, and/or the forget gate. The BDLSTM RNN may predict suspicious network activity based on layer outputs of the forward direction hidden layer and/or the reverse direction hidden layer. The BDLSTM RNN may be modified with a CEC architecture and may be configured to perform the predicting in real-time. For example, the BDLSTM RNN may predict in real-time by analyzing streams of network data using hidden layers, including but not limited to a forward direction hidden layer and a reverse direction hidden layer.

Figure 4:
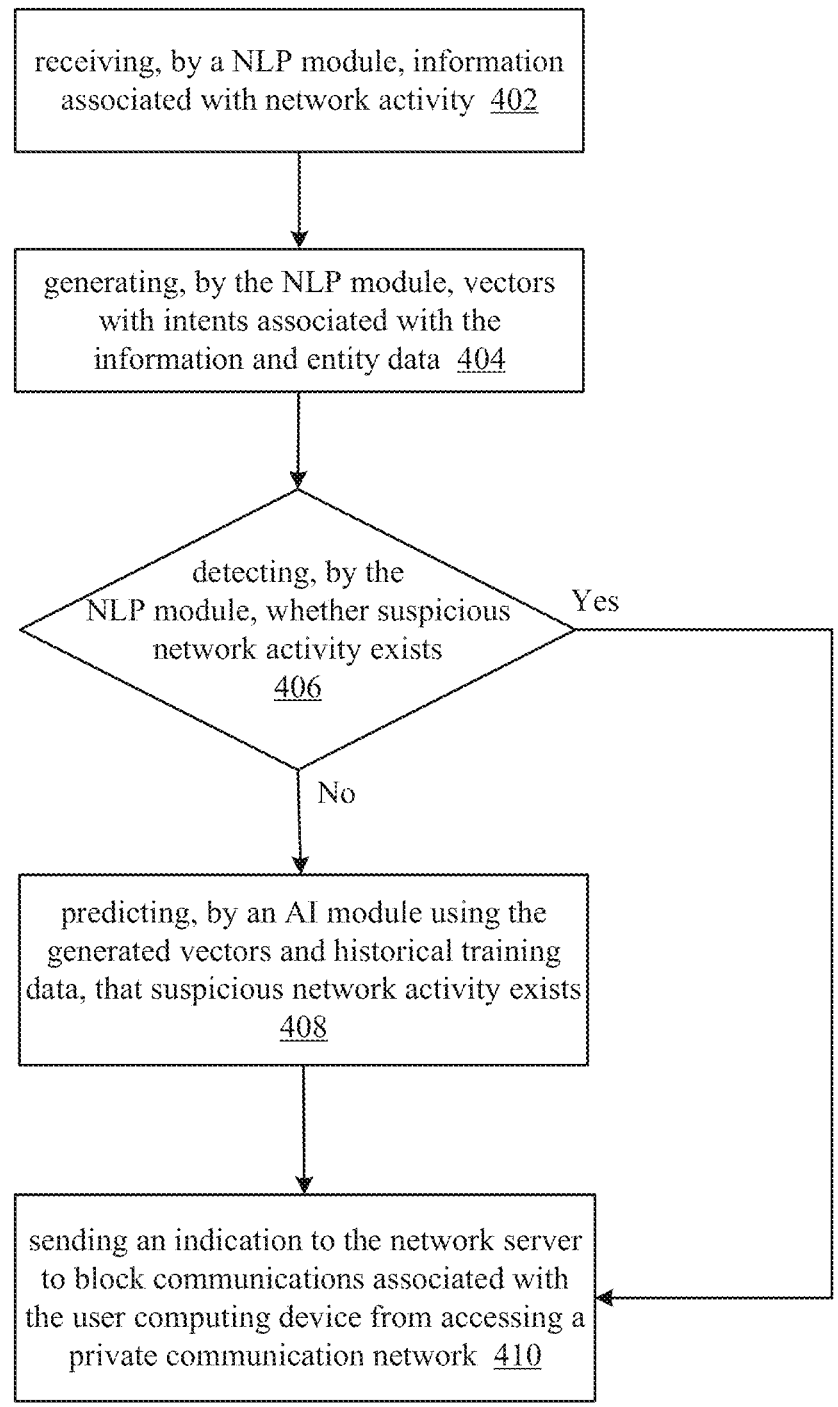
FIG. 4 shows an example algorithm performed by a network monitoring platform, in accordance with one or more example arrangements.

FIG. 4 shows an example algorithm performed by a network monitoring platform, in accordance with one or more example arrangements. The network monitoring platform 104 may use a utility 220 to collect real time data regarding user activities within a network. For example, the network monitoring platform 104 may communicate with the enterprise user devices 108 and/or one or more servers associated with the private network 125 to collect user activity information. An NLP module 204 may receive 402 the information associated with network activity. The NLP/NLU module 204 may be a first-level (L1 in FIG. 2) module of an ensemble, network monitoring system. The NLP module 204 may be configured to generate 404 vectors with intents based on at least network activity from the network server corresponding to a user computing device of the plurality of user computing devices. Moreover, the NLP module 204 may be configured to generate 404 vectors with entity data also based on at least network activity from the network server corresponding to a user computing device of the plurality of user computing devices.

Next, the ensemble network monitoring system may process the generated vectors to detect 406 if suspicious network activity exists. In some embodiments, the NLP module 204 monitors for the actual presence/existence of suspicious network activity and does not predict/forecast it. Assuming the existence of suspicious network activity is found, the ensemble, network monitoring system may cause to be sent 410 an indication to a network server 135 to block communications associated with user computing devices 110 from accessing the private communication network 125.

However, when the existence of suspicious network activity is not confirmed, the ensemble, network monitoring system may turn to the L2 AI module 208 to predict 408 whether the network activity corresponds to suspicious network activity. The predicting may be done using a non-deterministic algorithm with randomness. In one example, a constant error carousel (CEC) architecture may be used to assist the multi-level, ensemble network monitoring system. The decision to block (see step 410) communications may be made in a L3 module 212 or, in some embodiments, in an earlier level/stage module such as L1 (ref. 204) or L2 (ref. 208). The blocking of communications by the network server 135 may be done through known methods and/or components of a router/gateway/firewall.

Figure 5:
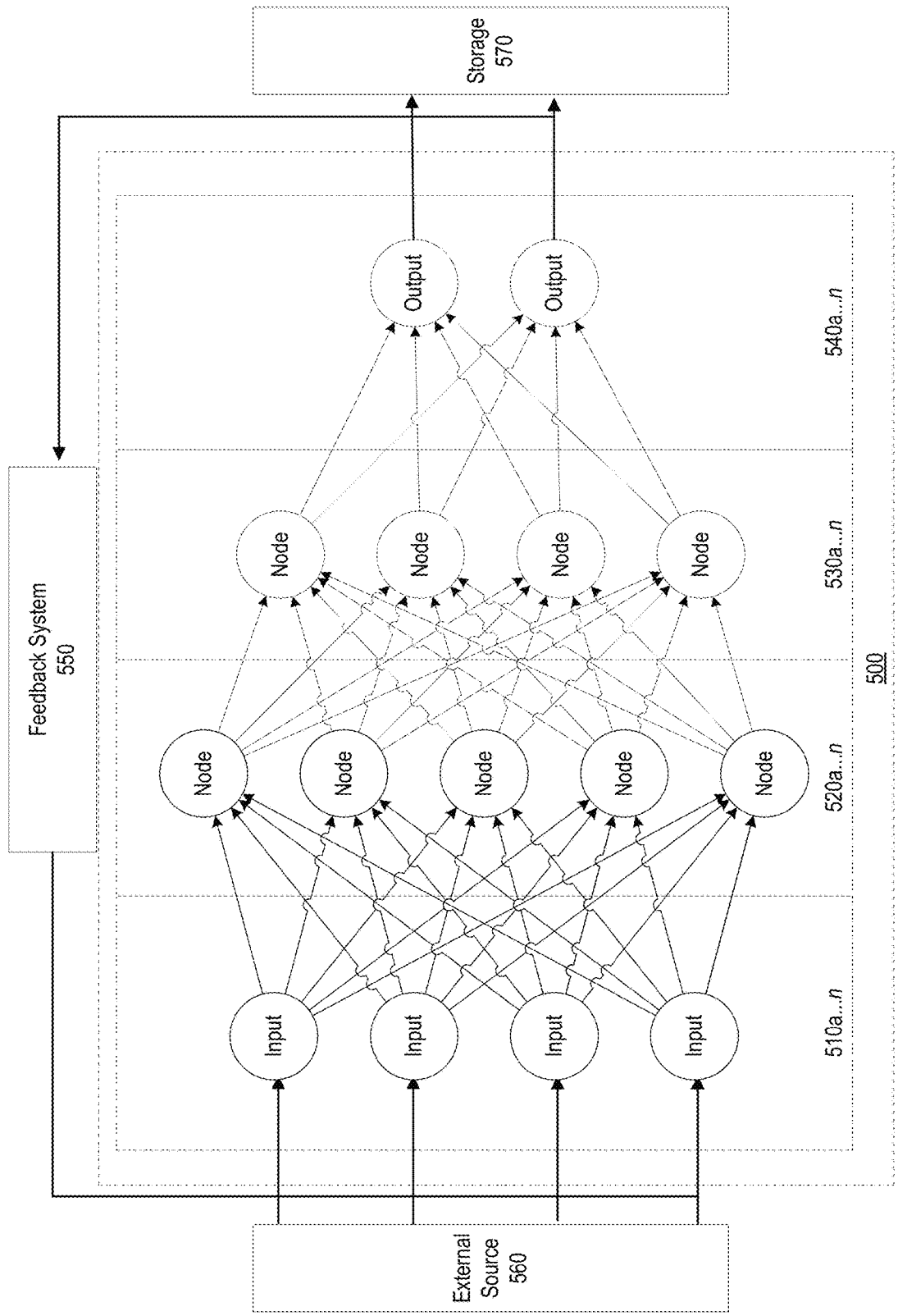
FIG. 5 shows a simplified example of an artificial neural network on which a machine learning algorithm may be executed, in accordance with one or more example arrangements.

FIG. 5 illustrates a simplified example of an artificial neural network 500 on which a machine learning algorithm may be executed. The machine learning algorithm may be used by the AI engine 150-2 to perform one or more functions of the electronic monitoring platform 104, as described herein. FIG. 5 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, an administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 1000 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "95% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 5, each of input nodes 510a-n is connected to a first set of processing nodes 520a-n. Each of the first set of processing nodes 520a-n is connected to each of a second set of processing nodes 530a-n. Each of the second set of processing nodes 530a-n is connected to each of output nodes 540a-n. Though only two sets of processing nodes are shown, any number of processing nodes may be implemented. Similarly, though only four input nodes, five processing nodes, and two output nodes per set are shown in FIG. 5, any number of nodes may be implemented per set. Data flows in FIG. 5 are depicted from left to right: data may be input into an input node, may flow through one or more processing nodes, and may be output by an output node. Input into the input nodes 510a-n may originate from an external source 560. The input from the input nodes may be, for example, sensor measurements (e.g., gas concentration measurements, millimeter wave scanner measurements) and or other characteristics associated with an individual (e.g., movement patterns, path patterns, dressing patterns, micro expressions, and the like). Output may be sent to a feedback system 550 and/or to storage 570. The output from an output node may be an indication of whether the sensor measurements and/or other characteristics associated with the individual are anomalous. The output from an output node may be a notification to a notification to one or more devices in the network (e.g., the actuators 128, the administrative computing device 108, and/or the user computing device 112). The output from an output node may be a notification to the administrative computing device 108. The feedback system 550 may send output to the input nodes 510a-n for successive processing iterations with the same or different input data.

In one illustrative method using feedback system 550, the system may use machine learning to determine an output. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 5 depicts nodes that may perform various types of processing, such as discrete computations, computer programs, and/or mathematical functions implemented by a computing device. For example, the input nodes 510a-n may comprise logical inputs of different data sources, such as one or more data servers. The processing nodes 520a-n may comprise parallel processes executing on multiple servers in a data center. And, the output nodes 540a-n may be the logical outputs that ultimately are stored in results data stores, such as the same or different data servers as for the input nodes 510a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 500 may learn and/or be dynamically reconfigured. Though nodes are depicted as having connections only to successive nodes in FIG. 5, connections may be formed between any nodes. For example, one processing node may be configured to send output to a previous processing node.

Input received in the input nodes 510*a-n* may be processed through processing nodes, such as the first set of processing nodes 520*a-n* and the second set of processing nodes 530*a-n*. The processing may result in output in output nodes 540*a-n*. As depicted by the connections from the first set of processing nodes 520*a-n* and the second set of processing nodes 530*a-n*, processing may comprise multiple steps or sequences. For example, the first set of processing nodes 520*a-n* may be a rough data filter, whereas the second set of processing nodes 530*a-n* may be a more detailed data filter.

The artificial neural network 500 may be configured to effectuate decision-making. As a simplified example for the purposes of explanation, the artificial neural network 500 may be configured to detect faces in photographs. The input nodes 510*a-n* may be provided with a digital copy of a photograph. The first set of processing nodes 520*a-n* may be each configured to perform specific steps to remove non-facial content, such as large contiguous sections of the color red. The second set of processing nodes 530*a-n* may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 500 may then predict the location on the face. The prediction may be correct or incorrect.

The feedback system 550 may be configured to determine whether or not the artificial neural network 500 made a correct decision. Feedback may comprise an indication of a correct answer and/or an indication of an incorrect answer and/or a degree of correctness (e.g., a percentage). For example, in the facial recognition example provided above, the feedback system 550 may be configured to determine if the face was correctly identified and, if so, what percentage of the face was correctly identified. The feedback system 550 may already know a correct answer, such that the feedback system may train the artificial neural network 500 by indicating whether it made a correct decision. The feedback system 550 may comprise human input, such as an administrator telling the artificial neural network 500 whether it made a correct decision. The feedback system may provide feedback (e.g., an indication of whether the previous output was correct or incorrect) to the artificial neural network 500 via input nodes 510*a-n* or may transmit such information to one or more nodes. The feedback system 550 may additionally or alternatively be coupled to the storage 570 such that output is stored. The feedback system may not have correct answers at all, but instead base feedback on further processing: for example, the feedback system may comprise a system programmed to identify faces, such that the feedback allows the artificial neural network 500 to compare its results to that of a manually programmed system.

The artificial neural network 500 may be dynamically modified to learn and provide better input. Based on, for example, previous input and output and feedback from the feedback system 550, the artificial neural network 500 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 500, such that the artificial neural network 500 may vary its nodes and connections to test hypotheses.

The artificial neural network 500 need not have a set number of processing nodes or number of sets of processing nodes, but may increase or decrease its complexity. For example, the artificial neural network 500 may determine that one or more processing nodes are unnecessary or should be repurposed, and either discard or reconfigure the processing nodes on that basis. As another example, the artificial neural network 500 may determine that further processing of all or part of the input is required and add additional processing nodes and/or sets of processing nodes on that basis.

The feedback provided by the feedback system 550 may be mere reinforcement (e.g., providing an indication that output is correct or incorrect, awarding the machine learning algorithm a number of points, or the like) or may be specific (e.g., providing the correct output). For example, the machine learning algorithm 500 may be asked to detect faces in photographs. Based on an output, the feedback system 550 may indicate a score (e.g., 75% accuracy, an indication that the guess was accurate, or the like) or a specific response (e.g., specifically identifying where the face was located).

The artificial neural network 500 may be supported or replaced by other forms of machine learning. For example, one or more of the nodes of artificial neural network 500 may implement a decision tree, associational rule set, logic programming, regression model, cluster analysis mechanisms, Bayesian network, propositional formulae, generative models, and/or other algorithms or forms of decision-making. The artificial neural network 500 may effectuate deep learning.

Various examples described herein may enable efficient detection of anomalies at a physical location and notification of the same. Various examples herein may enable proactive measures to be undertaken based on AI-based detection of anomalies based on sensor-measured user activity and/or physical phenomena.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A multi-level, ensemble network monitoring system for detection of suspicious network activity from a plurality of user computing devices on an external network communicatively connected via a network server to a private communication network, the system comprising:
a high-volume data storage unit comprising historical training data collected over the private communication network;
at least one processor;
a first-level natural language processing (NLP) module of an ensemble configured as a pre-processor for feature engineering to generate vectors with intents and entity data based on at least network activity from the network server corresponding to a user computing device of the plurality of user computing devices;
a second-level artificial intelligence (AI) module of the ensemble configured for reinforcement learning using the generated vectors and the historical training data, wherein the second-level AI module comprises a non-deterministic algorithm with randomness; and
memory storing computer-readable instructions that, when executed by the at least one processor, cause the network monitoring system to:
receive, from the first-level NLP module, information associated with the network activity corresponding to the user computing device;
process, by the processor, the generated vectors comprising intents associated with the information to detect if the suspicious network activity exists;
detect, by the first-level NLP, any suspicious network activity corresponding to the user computing device;
after failing to detect the suspicious network activity, predict, by the second-level AI module using the generated vectors, that the network activity corresponds to the suspicious network activity from the user computing device; and
send, based on the predicting, an indication to the network server to block communications associated with the user computing device from accessing the private communication network.

2. The system of claim 1, wherein the first-level NPL module starts executing before the second-level AI module in order of execution in the multi-level, ensemble network monitoring system.

3. The system of claim 1, wherein the detecting step is performed by the first-level NLP module in real-time.

4. The system of claim 1, wherein the first-level NLP module comprises an intent classifier.

5. The system of claim 1, wherein the first-level NLP module is further configured for feature engineering using the historical training data stored in the high-volume data storage unit.

6. The system of claim 1, wherein the second-level AI module comprises a constant error carousel (CEC) to mitigate vanishing and exploding gradients in the historical training data.

7. The system of claim 6, wherein the CEC comprises a recurrent neural network (RNN) to perform the predict step in real-time.

8. The system of claim 7, wherein the RNN comprises a bidirectional long-short term memory (BDLSTM) recurrent neural network.

9. The system of claim 1, wherein the information corresponds to one of:
a screenshot of a display associated with the user computing device;
internet browsing activity associated with the user computing device;
text input at the user computing device; and
combinations thereof.

10. A non-transitory computer-readable medium storing computer-executable instructions that, when executed by at least one processor, causes a multi-level, ensemble network monitoring platform to:
receive, by a first-level natural language processing (NLP) module of an ensemble, information associated with network activity corresponding to a user computing device of a plurality of user computing devices on an external network communicatively connected via a network server to a private communication network;
detect whether suspicious network activity corresponds to the user computing device by processing vectors comprising intents associated with the information, wherein the vectors are generated by the first-level NLP module configured as a pre-processor for feature engineering to generate vectors with intents and entity data based on at least the network activity from the network server corresponding to the user computing device;

after not detecting the suspicious network activity, predict, by a second-level artificial intelligence (AI) module using the generated vectors and historical training data stored in a data storage unit, that the network activity corresponds to the suspicious network activity from the user computing device, wherein the second-level AI module is configured for reinforcement learning using the generated vectors and the historical training data; and send, based on the predicting, an indication to the network server to block communications associated with the user computing device from accessing the private communication network.

11. The non-transitory computer-readable medium of claim 10, wherein the second-level AI module comprises a non-deterministic algorithm with randomness.

12. The non-transitory computer-readable medium of claim 10, wherein the second-level AI module comprises a constant error carousel (CEC) to mitigate vanishing and exploding gradients in the historical training data.

13. The non-transitory computer-readable medium of claim 12, wherein the CEC comprises a recurrent neural network (RNN) to perform the predict step in real-time.

14. The non-transitory computer-readable medium of claim 10, wherein the second-level AI module comprises a bidirectional long-short term memory (BDLSTM) recurrent neural network (RNN).

15. The non-transitory computer-readable medium of claim 10, wherein the first-level NLP module is further configured for feature engineering using the historical training data stored in the data storage unit.

16. The non-transitory computer-readable medium of claim 10, wherein the information corresponds to one of:
 a screenshot of a display associated with the user computing device;
 internet browsing activity associated with the user computing device;
 text input at the user computing device; and
 combinations thereof.

17. A method comprising:
receiving, by a first-level natural language processing (NLP) module of a multi-level ensemble system, information associated with network activity corresponding to a user computing device of a plurality of user computing devices on an external network communicatively connected via a network server to a private communication network;

generating, by the first-level NLP module configured as a pre-processor for feature engineering, vectors with intents associated with the information and entity data based on at least the network activity from the network server corresponding to the user computing device;

detecting, by the first-level NLP module, whether suspicious network activity corresponds to the user computing device by processing the generated vectors;

after not detecting the suspicious network activity, predicting, by a second-level artificial intelligence (AI) module of the multi-level ensemble system using the generated vectors and historical training data stored in a data storage unit, that the network activity corresponds to the suspicious network activity from the user computing device, wherein the second-level AI module comprises a non-deterministic algorithm with randomness; and sending, based on the predicting, an indication to the network server to block communications associated with the user computing device from accessing the private communication network.

18. The method of claim 17, wherein the second-level AI module is configured for reinforcement learning using the generated vectors and the historical training data.

19. The method of claim 17, wherein the detecting by the first-level NPL module starts executing before the predicting by the second-level AI module.

20. The method of claim 17, wherein the second-level AI module comprises a constant error carousel (CEC) to mitigate vanishing and exploding gradients in the historical training data, and wherein the CEC comprises a recurrent neural network (RNN) to perform the predicting step in real-time, and wherein the RNN comprises a bidirectional long-short term memory (BDLSTM) recurrent neural network.

\* \* \* \* \*